United States Patent
Lin et al.

(10) Patent No.: US 12,414,042 B2
(45) Date of Patent: Sep. 9, 2025

(54) METHODS AND APPARATUSES FOR SEARCH SPACE SET GROUP SWITCHING ENHANCEMENTS

(71) Applicant: Samsung Electronics Co., Ltd., Suwon-si (KR)

(72) Inventors: Qiongjie Lin, Sunnyvale, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 17/653,445

(22) Filed: Mar. 3, 2022

(65) Prior Publication Data

US 2022/0295401 A1   Sep. 15, 2022

Related U.S. Application Data

(60) Provisional application No. 63/196,883, filed on Jun. 4, 2021, provisional application No. 63/159,214, filed on Mar. 10, 2021.

(51) Int. Cl.
*H04W 52/02* (2009.01)
*H04W 72/0446* (2023.01)
*H04W 72/1263* (2023.01)
*H04W 72/23* (2023.01)

(52) U.S. Cl.
CPC ... *H04W 52/0232* (2013.01); *H04W 52/0216* (2013.01); *H04W 72/0446* (2013.01); *H04W 72/1263* (2013.01); *H04W 72/23* (2023.01)

(58) Field of Classification Search
CPC ............. H04W 52/0232; H04W 72/23; H04W 52/0216; H04W 72/0446; H04W 72/1263
See application file for complete search history.

(56) References Cited

U.S. PATENT DOCUMENTS 10,951,383 B2 * 3/2021 Lu .......................... H04L 5/0094
12,035,239 B2 * 7/2024 Wu ......................... H04W 72/23
(Continued)

FOREIGN PATENT DOCUMENTS

| EP | 4412361 A1 | 8/2024 |
| EP | 4422284 A1 | 8/2024 |
| WO | 2020145747 A1 | 7/2020 |

OTHER PUBLICATIONS

"5G; NR; Physical channels and modulation (3GPP TS 38.211 version 16.4.0 Release 16)", ETSI TS 138 211 V16.4.0, Jan. 2021, 137 pages.

(Continued)

*Primary Examiner* — Jael M Ulysse

(57) ABSTRACT

Methods and apparatuses for search space set group switching. A method for operating a user equipment includes receiving information for search space set groups and a first physical downlink control channel (PDCCH) that provides a downlink control information (DCI) format that includes a PDCCH monitoring adaptation field of two or more bits. The method further includes determining that a first bit of the PDCCH monitoring adaptation field indicates switching to the search space set group or skipping reception of second PDCCHs and determining that remaining bits of the PDCCH monitoring adaptation field indicate a group index for a search space set group $n_{SSSG}$ or a time duration $T_{skip}$. The method further includes receiving the third PDCCHs according to search space sets included in the search space set group $n_{SSSG}$ or skipping the reception of PDCCHs for the time duration $T_{skip}$.

9 Claims, 8 Drawing Sheets

(56) References Cited

U.S. PATENT DOCUMENTS

| | | | | |
|---|---|---|---|---|
| 2019/0394759 | A1* | 12/2019 | Ying | H04L 1/0061 |
| 2020/0314898 | A1 | 10/2020 | Sun et al. | |
| 2020/0322929 | A1* | 10/2020 | Bagheri | H04L 5/0053 |
| 2020/0351847 | A1* | 11/2020 | Kim | H04L 5/0094 |
| 2020/0351926 | A1* | 11/2020 | Bagheri | H04W 72/23 |
| 2021/0051759 | A1* | 2/2021 | Zhou | H04W 52/0206 |
| 2021/0084590 | A1* | 3/2021 | Nam | H04W 52/0216 |
| 2022/0039008 | A1* | 2/2022 | Nimbalker | H04W 52/02 |
| 2022/0039072 | A1* | 2/2022 | Babaei | H04W 72/23 |
| 2022/0132563 | A1 | 4/2022 | Kim et al. | |
| 2022/0191789 | A1* | 6/2022 | Reial | H04W 48/12 |
| 2022/0312463 | A1* | 9/2022 | Niu | H04W 52/0235 |
| 2022/0338123 | A1* | 10/2022 | Xu | H04L 5/0053 |
| 2023/0024010 | A1* | 1/2023 | Ma | H04L 5/0053 |
| 2023/0269742 | A1* | 8/2023 | Kuang | H04W 72/1263 370/329 |
| 2023/0319845 | A1* | 10/2023 | Guo | H04W 72/1273 370/329 |
| 2024/0073816 | A1* | 2/2024 | Lai | H04L 5/0053 |
| 2024/0080771 | A1* | 3/2024 | Jung | H04W 76/28 |
| 2024/0121798 | A1* | 4/2024 | Guo | H04W 52/0216 |
| 2024/0137946 | A1* | 4/2024 | Zhao | H04W 52/0229 |
| 2024/0298334 | A1* | 9/2024 | Nimbalker | H04L 5/001 |

OTHER PUBLICATIONS

"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
International Search Report and Written Opinion issued Jun. 14, 2022 regarding International Application No. PCT/KR2022/003383, 7 pages.
Qualcomm Incorporated, "DCI-based power saving adaptation during DRX Active Time", 3GPP TSG-RAN WG1 #104-e, R1-2101476, Jan. 2021, 4 pages.
CMCC, "Discussion on PDCCH monitoring reduction during DRX active time", 3GPP TSG RAN WG1 #104-e, R1-2101054, Jan. 2021, 3 pages.
Huawei et al., "Extension(s) to Rel-16 DCI-based power saving adaptation for an active BWP", 3GPP TSG RAN WG1 Meeting #104-e, R1-2100218, Jan. 2021, 8 pages.
Extended European Search Report issued Dec. 20, 2024 regarding Application No. 22767540.2, 16 pages.
Nokia et al., "Remaining issues on DL signals and channels", 3GPP TSG RAN WG1 Meeting #100e, R1-2000501, Feb. 2020, 21 pages.
Moderator (vivo), "Final FL summary of DCI-based power saving adaptation", 3GPP TSG RAN WG1#107-e, R1-2112878 Nov. 2021, 120 pages.

* cited by examiner

METHODS AND APPARATUSES FOR SEARCH SPACE SET GROUP SWITCHING ENHANCEMENTS

CROSS-REFERENCE TO RELATED APPLICATION AND CLAIM OF PRIORITY

This application claims priority under 35 U.S.C. § 119(e) to U.S. Provisional Patent Application No. 63/159,214 filed on Mar. 10, 2021 and U.S. Provisional Patent Application No. 63/196,883 filed on Jun. 4, 2021. The above-identified provisional patent applications are hereby incorporated by reference in their entirety.

TECHNICAL FIELD

The present disclosure relates generally to wireless communication systems and, more specifically, the present disclosure relates to search space set group switching enhancements.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to search space set group switching enhancements.

In one embodiment, a user equipment (UE) is provided. The UE includes a transceiver configured to receive information for search space set groups and first physical downlink control channels (PDCCHs) according to a first number of search space sets that include a first search space set. A search space set group includes one or more search space sets. A first PDCCH, of the first PDCCHs, received according to the first search space set provides a downlink control information (DCI) format that includes a PDCCH monitoring adaptation field of two or more bits. The UE further includes a processor operably coupled to the transceiver. The processor is configured to determine that a first bit of the PDCCH monitoring adaptation field indicates one of: switching to the search space set group, or skipping reception of second PDCCHs, and that one or more remaining bits of the PDCCH monitoring adaptation field indicate one of: a group index for a search space set group $n_{SSSG}$, if the first bit indicates switching to the search space set group, or a time duration $T_{skip}$, if the first bit indicates skipping reception of the second PDCCHs. The transceiver is further configured to one of: receive the third PDCCHs according to search space sets included in the search space set group $n_{SSSG}$, or skip the reception of the second PDCCHs for the time duration $T_{skip}$.

In another embodiment, a base station (BS) is provided. The BS includes a transceiver configured to transmit: information for search space set groups and first PDCCHs according to a first number of search space sets that include a first search space set. A search space set group includes one or more search space sets. A first PDCCH, of the first PDCCHs, transmitted according to the first search space set provides a DCI format that includes a PDCCH monitoring adaptation field of two or more bits. The BS further includes a processor operably coupled to the transceiver, the processor configured to determine: that a first bit of the PDCCH monitoring adaptation field indicates one of: switching to the search space set group or skipping reception of second PDCCHs, and that one or more remaining bits of the PDCCH monitoring adaptation field indicate one of: a group index for a search space set group $n_{SSSG}$, if the first bit indicates switching to the search space set group or a time duration $T_{skip}$, if the first bit indicates skipping transmission of the second PDCCHs. The transceiver is further configured to one of: transmit the third PDCCHs according to search space sets included in the search space set group with group index $n_{SSSG}$, or skip the transmission of the second PDCCHs for the time duration $T_{skip}$.

In yet another embodiment, a method is provided. The method includes receiving: information for search space set groups and first PDCCHs according to a first number of search space sets that include a first search space set. A search space set group includes one or more search space sets. A first PDCCH, of the first PDCCHs, received according to the first search space set provides a DCI format that includes a PDCCH monitoring adaptation field of two or more bits. The method further includes determining: that a first bit of the PDCCH monitoring adaptation field indicates one of: switching to the search space set group or skipping reception of second PDCCHs, and that one or more remaining bits of the PDCCH monitoring adaptation field indicate one of: a group index for a search space set group $n_{SSSG}$, if the first bit indicates switching to the search space set group or a time duration $T_{skip}$, if the first bit indicates skipping reception of the second PDCCHs. The method further includes one of: receiving the third PDCCHs according to search space sets included in the search space set group $n_{SSSG}$ or skipping the reception of PDCCHs for the time duration $T_{skip}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
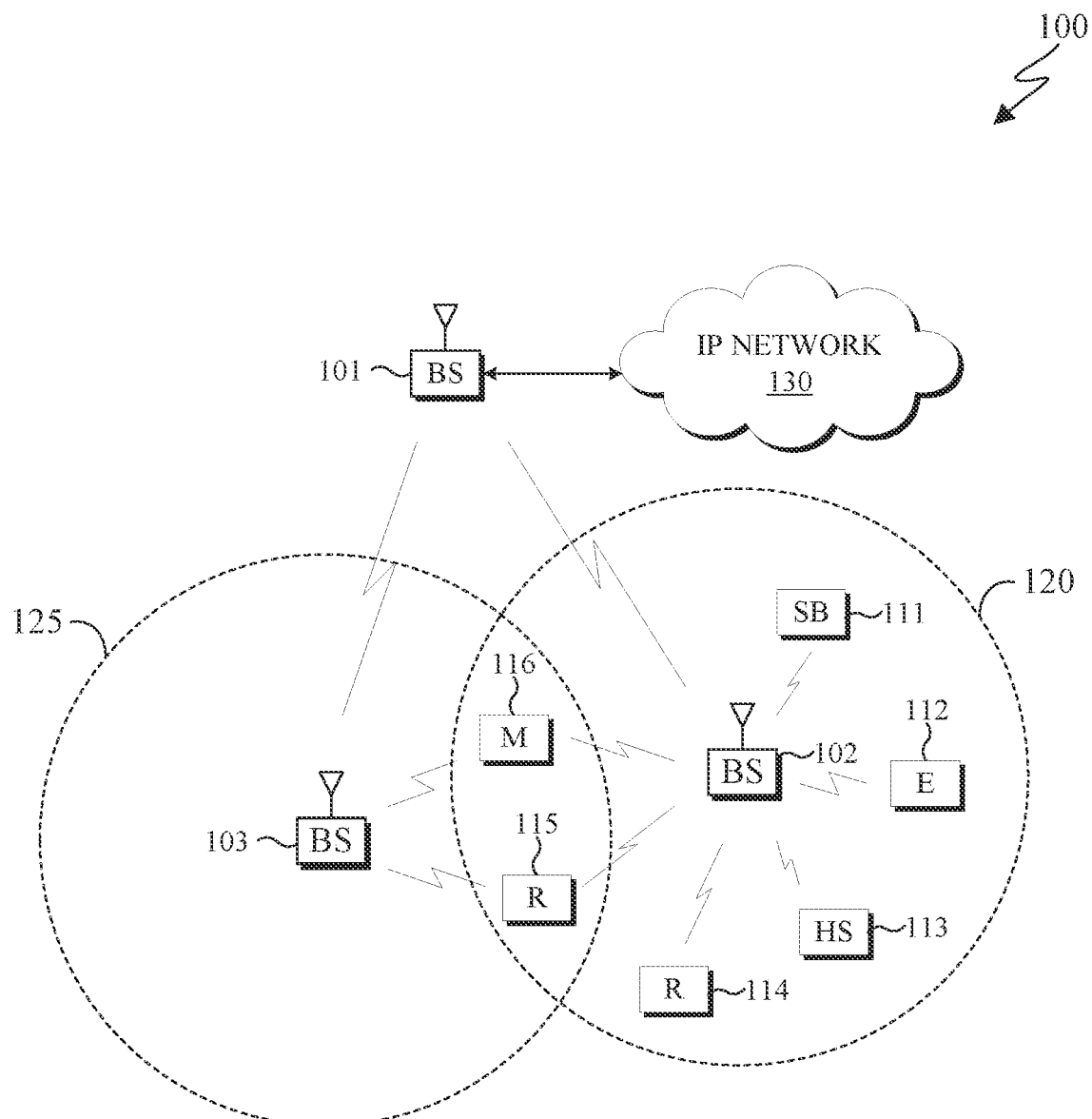
FIG. 1 illustrates an example wireless network according to embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" ("REF1"); 3GPP TS 38.212 v16.4.0, "NR; Multiplexing and channel coding" ("REF2"); 3GPP TS 38.213 v16.4.0, "NR; Physical layer procedures for control" ("REF3"); 3GPP TS 38.214 v16.4.0, "NR; Physical layer procedures for data" ("REF4"); 3GPP TS 38.321 v16.3.1, "NR; Medium Access Control (MAC) Protocol Specification" ("REF5"); and 3GPP TS 38.331 v16.3.1, "NR; Radio Resource Control (RRC) Protocol Specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
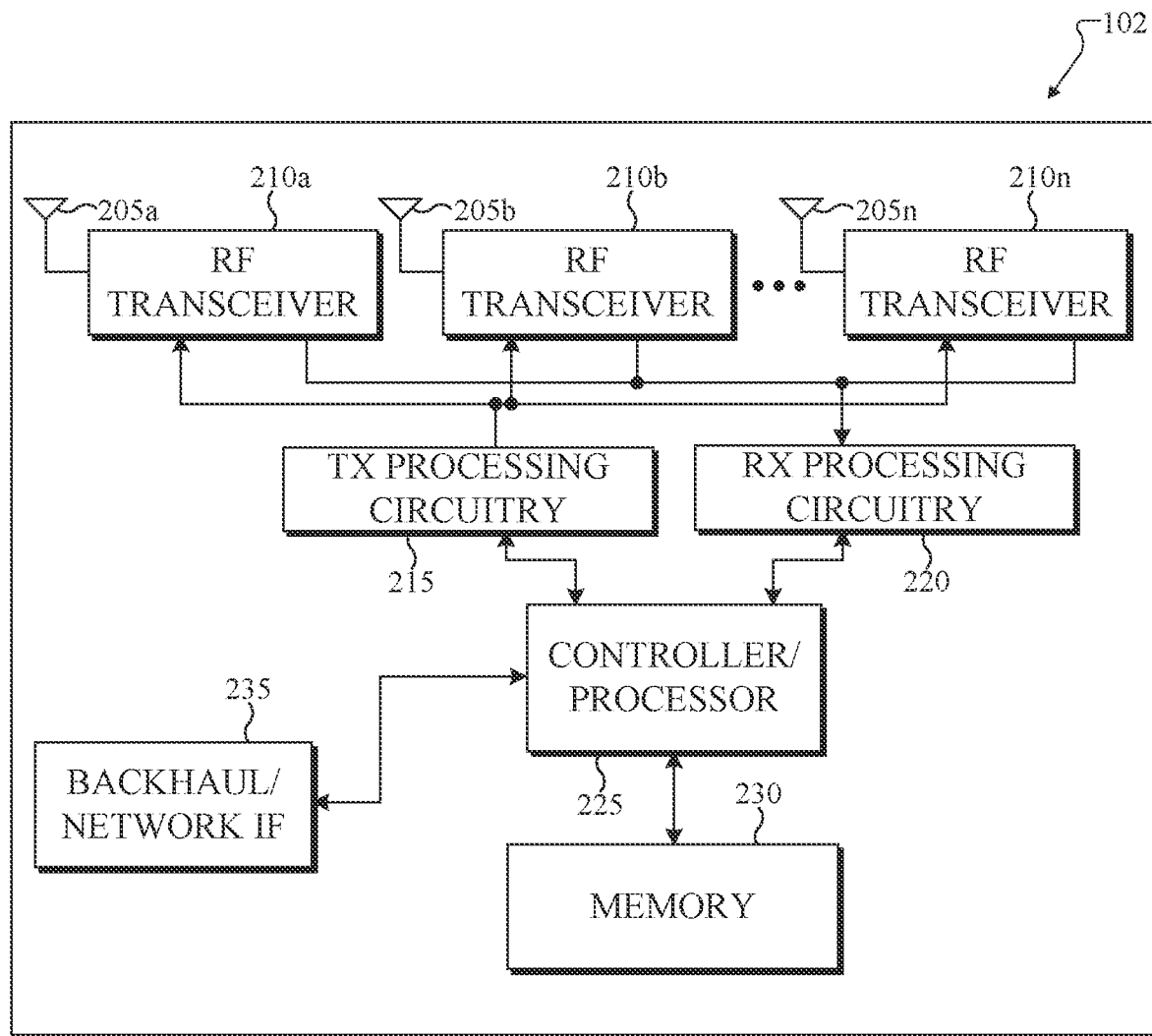
FIG. 2 illustrates an example BS according to embodiments of the present disclosure.
Figure 3:
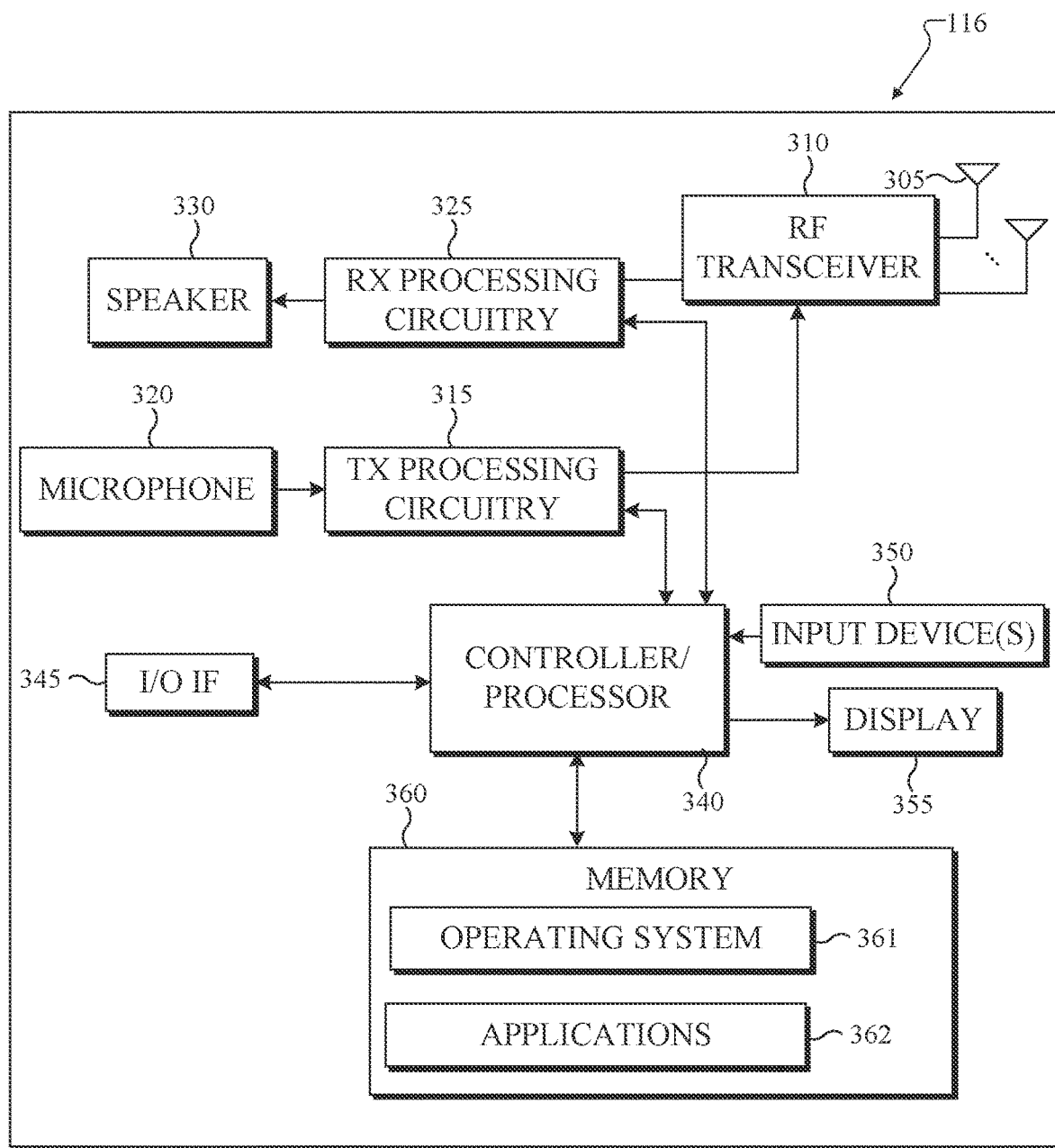
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for search space set group switching enhancements. In certain embodiments, and one or more of the BSs 101-103 includes circuitry, programing, or a combination thereof for search space set group switching enhancements.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support search space set group switching enhancements. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 215, RX processing circuitry 220, or any combination thereof) support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
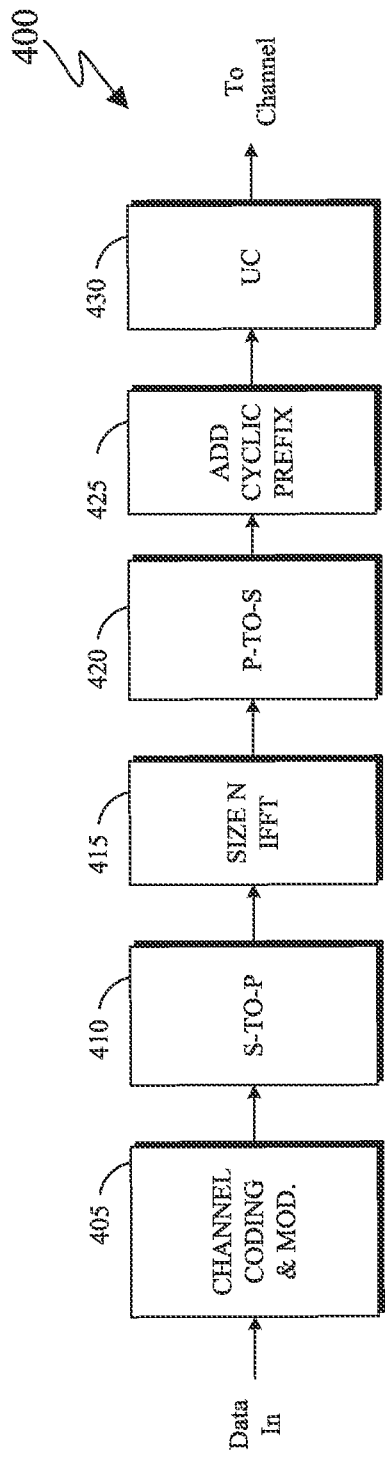
FIGS. 4 and 5 illustrate example wireless transmit and receive paths according to embodiments of the present disclosure.
Figure 5:
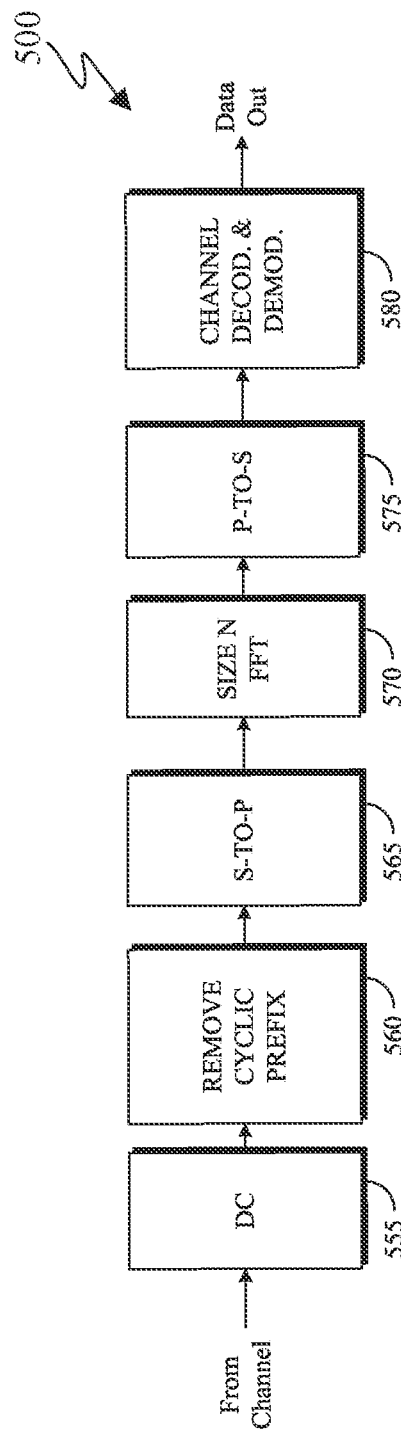

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support search space set group switching enhancements as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure take into consideration that various UE power saving techniques exist to extend battery life of mobile terminals without materially reducing the quality of service. For example, to avoid unnecessary UE wake-ups during discontinuous reception (DRX) in RRC_CONNECTED state (C-DRX), a UE can be indicated prior to the start of a next DRX cycle whether the UE should start the drx-onDurationTimer timer and monitor physical downlink control channel (PDCCH) at the next DRX cycle. The wake-up signal (WUS) is provided by a downlink control information (DCI) format, also referred to as DCI format 2_6, with cyclic redundancy check (CRC) scrambled by a power savings radio network temporary identifier (PS-RNTI) for the UE to identify the functionality of the DCI format.

A UE supporting certain applications, such as multicast and broadcast services (MB S) or extended reality (XR) services, may be configured to support hybrid traffic types. For example, a UE may support both mobile broadband (MBB) unicast traffic and multicast traffic. For another example, a UE may support both MBB unicast traffic and XR traffic. For yet another example, a UE may support multiple types of unicast traffic having different latency requirements.

In order to support various service traffic types, a UE (such as the UE 116) can be configured with more than one group of search space sets for PDCCH monitoring. Each search space set group (SSSG) can be used for PDCCH scheduling associated with a specific traffic type. For example, a UE can be scheduled MBS physical downlink shared channel (PDSCH) receptions using a first DCI format with CRC scrambled by a first radio network temporary identifier (RNTI), such as a group-RNTI (G-RNTI), and unicast PDSCH receptions using a second DCI format with CRC scrambled by a second RNTI, such as a cell-RNTI (C-RNTI). The UE can be configured to monitor PDCCH for detection of the first DCI format or the second DCI format according to a first group of search space sets or a second group of search space sets, respectively. During an ON duration of a DRX cycle, a gNB may not have unicast data in the buffer for the UE but may have multicast data for the UE, or the reverse. It is therefore beneficial to extend a WUS functionality to include indication for groups of search space sets that a UE needs to monitor PDCCH during an ON Duration of a DRX cycle instead of providing only an indication for whether the UE needs to monitor PDCCH during an ON Duration of a DRX cycle.

In certain embodiments, a UE (such as the UE 116) can be provided an indication for a SSSG either by a DCI format 2_0 in a common search space or by a timer as described in REF3. Using SSSG switching is also considered for UE power savings by PDCCH monitoring adaptation within an active time of a DRX cycle for UEs in RRC_CONNECTED state. However, search space group switching within the active time of a DRX cycle for a UE fails to avoid unnecessary PDCCH monitoring at least at the start of the active time and requires that the UE monitors PDCCH for detection of DCI formats associated with unicast traffic, such as DCI formats with CRC scrambled by a C-RNTI, when the UE may not have unicast traffic.

For PDCCH monitoring adaptation within DRX Active Time, both PDCCH skipping (where the UE does not monitor PDCCH for a time period) and SSSG switching can be considered.

Accordingly, embodiments of the present disclosure take into consideration that there is a need to support SSSG switching associated with DRX operation in RRC_CONNECTED state prior to a start of an active time.

Embodiments of the present disclosure take into consideration that there is also a need to support PDCCH monitoring adaptation based on SSSG switching and PDCCH skipping.

Embodiments of the present disclosure describe SSSG switching associated with C-DRX. This is described in the following examples and embodiments, such as those of FIGS. 6 and 7.

Figure 6:
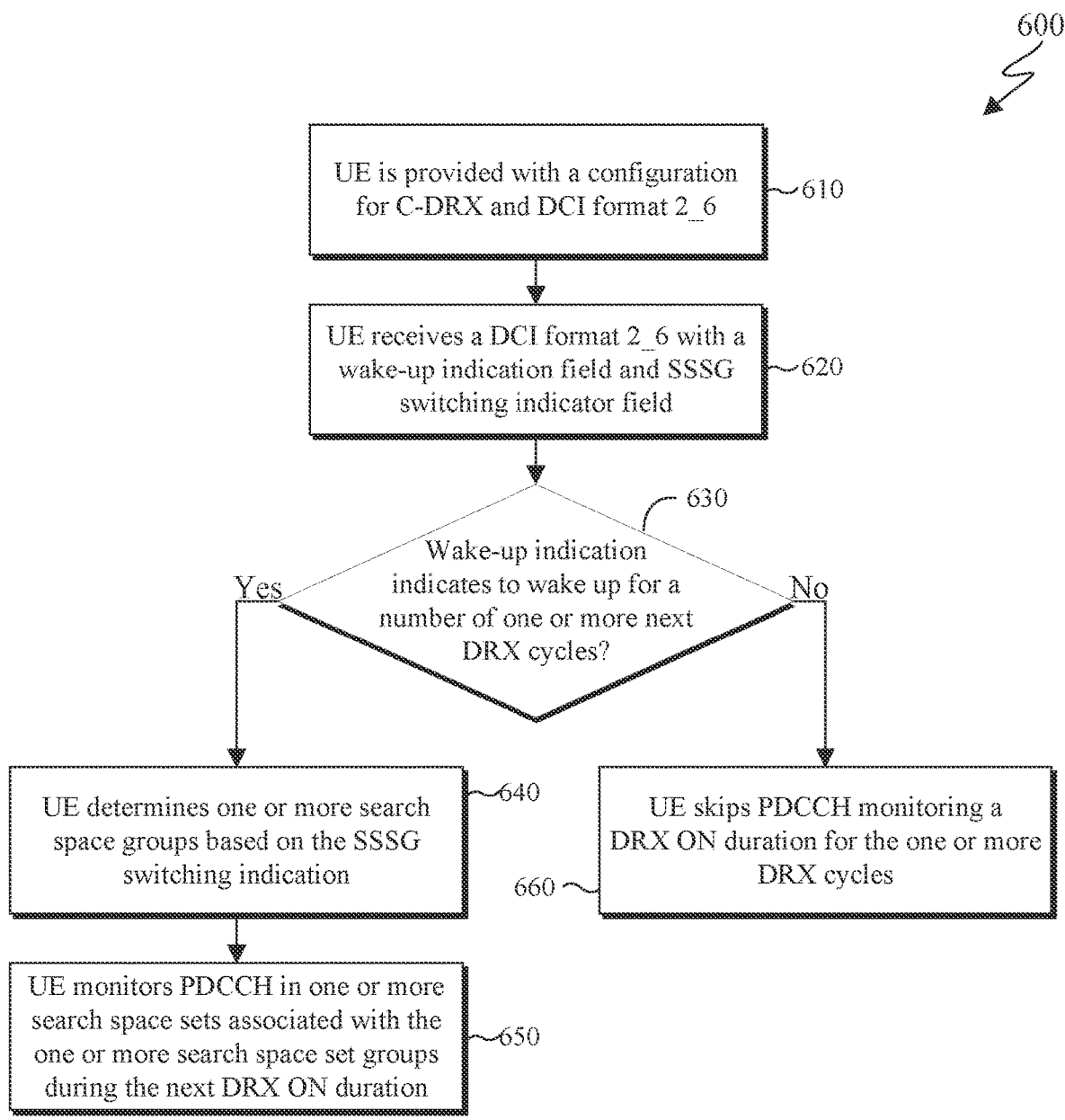
FIGS. 6 and 7 illustrate example methods of a UE procedure for search space set group (SSSG) switching associated with discontinuous reception (DRX) in an RRC_CONNECTED state (C-DRX) operation according to embodiments of the present disclosure.
Figure 7:
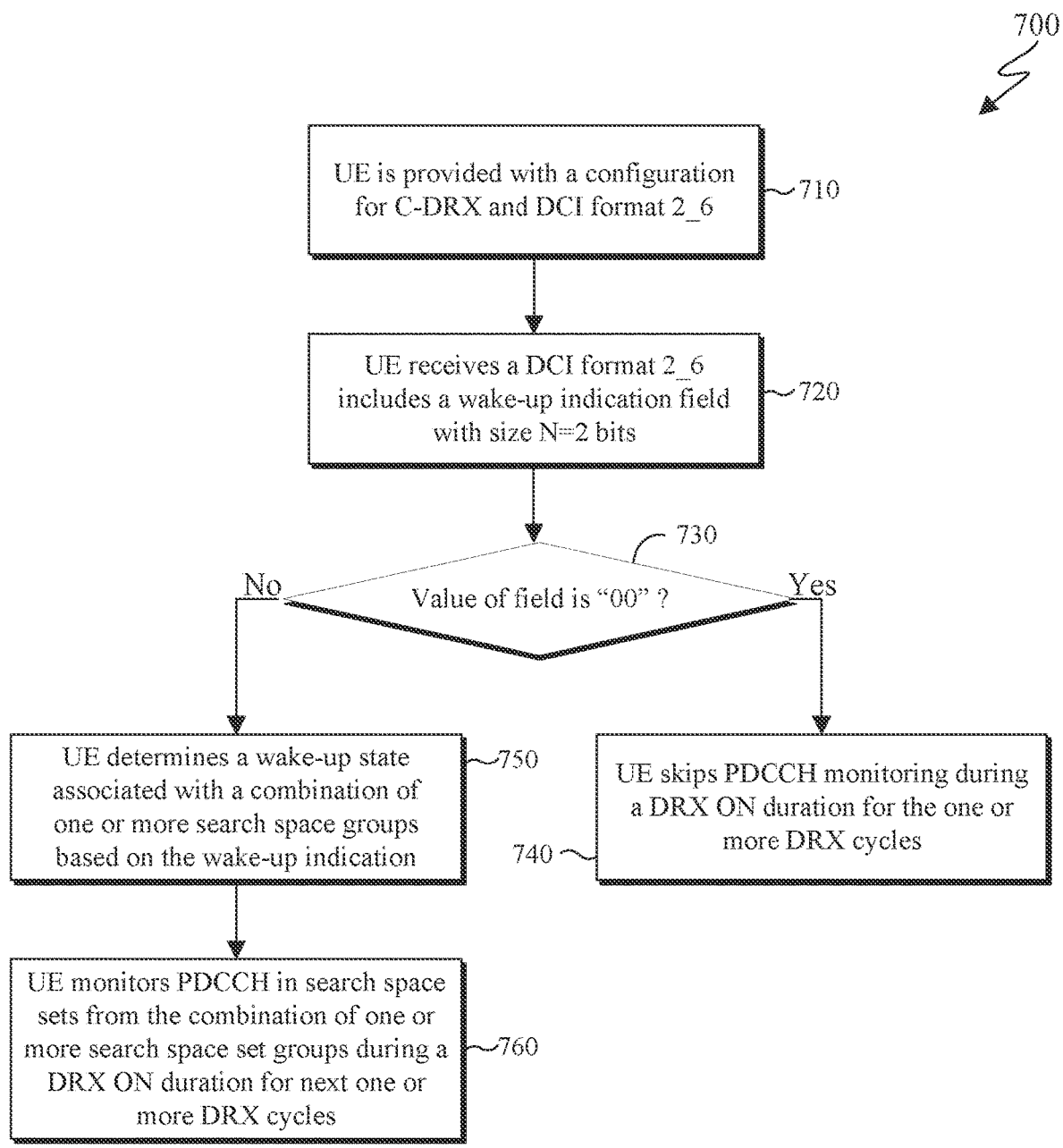

FIGS. 6 and 7 illustrate example methods 600 and 700, respectively, of a UE procedure for SSSG switching associated with C-DRX operation according to embodiments of the present disclosure. The steps of the method 600 of FIG. 6 and the method 700 of FIG. 7 can be performed by any of the UEs 111-116 of FIG. 1, such as the UE 116 of FIG. 3. The methods 600 and 700 are for illustration only and other embodiments can be used without departing from the scope of the present disclosure.

In certain embodiments, a UE (such as the UE 116) can be configured with one or more serving cells. The one or more serving cells can be grouped into one or more cell groups. A UE can be provided one or more SSSGs for a serving cell or for each downlink (DL) bandwidth part (BWP) of the serving cell. In the latter case, a number of SSSGs associated with an active DL BWP of a serving cell is considered for SSSG switching in the serving cell. A SSSG index can be provided for each configured search space set in a DL BWP of a serving cell.

In a first approach, a WUS field and a SSSG switching indicator field are separate fields in a DCI format 2_6. In a second approach, a single field serves both as a wake-up indicator and as an SSSG switching indicator wherein one value can indicate to a UE to skip PDCCH monitoring for a number of one or more next DRX cycles while remaining values of the SSSG switching indicator can provide one or more SSSGs for PDCCH monitoring during the number of one or more next DRX cycles.

For example, for a UE configured with two SSSGs for scheduling on a scheduled cell, an indication to a UE for PDCCH monitoring on an active DL BWP of a scheduling cell can comprise of two bits. For instance, a '00' value can indicate to the UE to skip PDCCH monitoring for scheduling on the scheduled cell during a next one or more DRX cycles. For another instance, a '01' value can indicate to the UE to monitor PDCCH according to a first SSSG. For another instance, a '10' value can indicate to the UE to monitor PDCCH according to a second SSSG. For another instance, a '11' value can indicate to the UE to monitor PDCCH according to both the first and second SSSGs.

For example, the first SSSG can be associated with DCI formats with CRC scrambled by a first set of one or more RNTIs and the second SSSG can be associated with DCI formats with CRC scrambled by a second set of one or more RNTIs. Also, instead of a single scheduled cell, the indication can be for a group of scheduled cells that is configured in advance by higher layer signaling.

In the first approach for SSSG switching associated with C-DRX operation, a UE (such as the UE 116) can be provided a configuration for a DCI format 2_6. The DCI format 2_6 includes a wake-up indication field to indicate to a UE whether to wake up for a next DRX ON duration. In the configuration of DCI format 2_6, the UE can be further provided with a SSSG switching indicator field. When the UE is triggered to wake up for a next DRX ON duration based on a wake-up indication in a DCI format 2_6, the UE also determines a combination of one or more SSSGs for PDCCH monitoring during the next DRX ON duration according to the SSSG switching indicator in the DCI format 2_6.

For determining a SSSG for PDCCH monitoring based on a SSSG switching indicator, a UE can perform any of the following example methods. In a first example method, a value of an SSSG switching indicator provides an index of a SSSG for all applicable serving cells. A size of $N_{bits}^{SSSGS}$ bits for the SSSG switching indicator is determined based on a number of configured SSSGs for all applicable serving cells. When the number of SSSGs for all applicable serving cells are same, $N_{bits}^{SSSGS}$ is same as the number of SSSGs for each applicable serving cell; otherwise, $N_{bits}^{SSSGS}$ can be equal to a maximum number of configured SSSGs for all applicable serving cells, as described in Equation (1), below. As shown in Equation (1) $N_{SSSG,i}$ is a number of SSSGs configured for an applicable serving cell with index i.

$$N_{bits}^{SSSGS} = \max\{N_{SSSG,i}\} \quad (1)$$

In a second example method, a value of the SSSG switching indicator provides an index of a SSSG for PDCCH monitoring per cell group. The SSSG switching indicator includes a number of fields, where each field corresponds to a cell group. A size of a field corresponding to a cell group j, $N_{bits,j}^{SSSGS}$, is determined based on a number of $N_{SSSG}$ SSSGs configured for cell group j, such that $N_{bits,j}^{SSSGS} = N_{SSSG,j}$. When a number of search space set groups is not same for all serving cells in cell group j, $N_{SSSG,j}$ is the maximum number of search space set groups configured among serving cells in cell group j, as described in Equation (2), below. As shown in Equation (2), $N_{SSSG,(i,j)}$ is the number of search space set groups configured for an applicable serving cell with index i in cell group j.

$$N_{SSSG,j} = \max\{N_{SSSG,(i,j)}\} \quad (2)$$

In a third example method, a value of the SSSG switching indicator indirectly provides a SSSG for PDCCH monitoring. In addition to DCI format 2_6 received outside DRX ON duration, a UE can be provided with a SSSG for PDCCH monitoring within an active time of DRX cycle. The SSSG switching indicator received in a DCI format 2_6 outside a DRX ON duration can include one bit to indicate to the UE to either to fall back to a default SSSG or to use a last SSSG that the UE used to monitor PDCCH during an active time of a last DRX cycle. The SSSG switching indicator can apply for all applicable serving cells. Alternatively, the SSSG switching indicator can include more than one bits, wherein each bit corresponds to a cell group with most significant bit (MSB) to least significant bit (LSB) corresponding to the first to last configured cell group.

The method 600 as illustrated in FIG. 6 describes an example UE procedure based on the first approach for SSSG switching associated with C-DRX operation.

In step 610, a UE (such as the UE 116), is provided a configuration for DRX operation in RRC_CONNECTED state, and a configuration for contents of a DCI format 2_6. In step 620, the UE monitors PDCCH for detection of the DCI format 2_6 and receives a DCI format 2_6 with a wake-up indication field a SSSG switching indicator field. In step 630, the UE determines whether the wake-up indication indicates wake-up for a number of one or more next DRX cycles.

If the wake-up indication indicates the UE to wake up for a number of one or more next DRX cycles (as determined in 630), the UE in step 640 determines one or more SSSGs for PDCCH receptions based on a value of the SSSG switching indicator. The UE, in step 650, also monitors PDCCH according to one or more search space sets associated with the one or more SSSGs during a DRX ON duration of the one or more next DRX cycles.

Alternatively, if the wake-up indication does not indicate that the UE is to wake up for a number of one or more next DRX cycles (as determined in 630), the UE in step 640 skips PDCCH monitoring in a DRX ON duration for the one or more DRX cycles.

In certain embodiments, a UE (such as the UE 116) is provided with a starting location of the SSSG switching indicator in the configuration of the DCI format 2_6. Alternatively, when a WUS indicator and a SSSG switching indicator are separately provided, the UE can assume that the SSSG switching indicator is next to the wake-up indicator for a primary cell or next to a dormancy indicator for a secondary cell (SCell) in DCI format 2_6. When cell groups are defined for dormancy indication, the cell groups can be same for SSSG switching indication.

In the second approach for SSSG switching associated with C-DRX operation, a UE (such as the UE 116) can be provided a configuration of DCI format 2_6. The DCI format 2_6 includes a number of $N_{WUS} \geq 1$ wake-up indications corresponding to $N_{WUS}$ cell groups. The (i+1)th wake-up indication with a size of $N_{bits}^{WUS,i}$ bits is used to indicate one of $2^{N_{bits}^{WUS,i}}$ wake-up states for the (i+1)th cell groups, where i=0, 1, . . . , $N_{WUS}$−1. The value of a wake-up indication indicates the index of wake-up state. For a cell group, i, a UE can be provided with up to $2^{N_{bits}^{WUS,i}}$ wake-up states either for each serving cell from the cell group i or for all serving cells from the cell group i.

For a serving cell from cell group i configured with up to $2^{N_{bits}^{WUS,i}}$ wake-up states, a first state of the $2^{N_{bits}^{WUS,i}}$ wake-up states indicates to skip next DRX ON duration. The remaining $2^{N_{bits}^{WUS,i}}-1$ wake-up state indicates to wake up to monitor PDCCH in an associated combination of one or more search space set groups during a DRX ON duration of one or more next DRX cycles for the serving cell. The search space set group combination associated with the kth (k=2, . . . , $2^{N_{bits}^{WUS,i}}-1$) wake-up state can be the kth combination of one or more search space set groups configured for the serving cell.

The method 700 as illustrated in FIG. 7 describes an example UE procedure based on the second approach for SSSG switching associated with C-DRX operation.

In step 710, a UE (such as the UE 116) UE is provided a configuration for DRX operation in RRC_CONNECTED state (C-DRX), and a configuration for contents of a DCI format 2_6. In step 720, the UE receives a DCI format 2_6 that includes a wake-up indication field (or a SSSG switching indicator field) with size of N=2 bits. In step 730, the UE determines whether a value of the field is '00.'

When the value is '00' (as determined in step 730), the UE in step 740 skips PDCCH monitoring during an DRX ON duration for next one or more DRX cycles. Alternatively, when the value is not '00' (as determined in step 730), the UE in step 750 determines based on the value a wake-up state based on the wake-up indication. It is noted that the wake-up state is associated with a combination of one or more SSSGs. Then in step 760, the UE then monitors PDCCH according to search space sets from the combination of one or more SSSGs during the DRX ON duration of the next one or more DRX cycles.

In certain embodiments, a UE (such as the UE 116) applies a default SSSG for PDCCH monitoring in a serving cell during a DRX ON duration for any of the following three examples. In a first example, when the UE is not provided an SSSG indicator for a serving cell, the UE can assume the default SSSG for the serving cell. For instance, the UE can be provided an SSSG indicator only for a primary cell and then the UE assumes the default SSSG for an SCell.

In a second example, a SSSG switching indicator or wake-up indicator may indicate a SSSG index that is not configured for the serving cell when the serving cell has a smaller number of SSSGs than other serving cells in a same group of serving cells.

In a third example, either a SSSG switching indicator or a wake-up indicator may expire after a predetermined time. A UE can apply a default search space set after a timer associated with SSSG switching indicator or wake-up indicator expires. The timer can be provided to the UE by a higher layer parameter per serving cell or per cell group. For instance, the UE decrements a timer value by one after each slot, or after each span of Y symbols when the UE is configured for span-based PDCCH monitoring based on a combination (X, Y), during DRX ON duration.

In certain embodiments, a UE can determine a default SSSG for a serving cell based on one of following three example, methods. For a first example method, the default SSSG can be a configured SSSG with a smallest index for an active DL BWP of the serving cell. For a second example method, the default SSSG can be the provided to the UE by a higher layer parameter. For a third example method, the default SSSG can include all configured search space sets for the active DL BWP of the serving cell.

Although FIG. 6 illustrates the method 600 and FIG. 7 illustrates the method 700 various changes may be made to FIGS. 6 and 7. For example, while the methods 600 and 700 are shown as a series of steps, various steps could overlap, occur in parallel, occur in a different order, or occur multiple times. In another example, steps may be omitted or replaced by other steps. For example, steps of the methods 600 and 700 can be executed in a different order.

Embodiments of the present disclosure describe unified design for SSSG switching and PDCCH skipping. This is described in the following examples and embodiments, such as those of FIGS. 8 and 9.

For example, embodiments of this disclosure consider PDCCH monitoring adaptation including both SSSG switching and PDCCH skipping. The PDCCH monitoring adaptation is triggered based on an PDCCH monitoring adaptation indicator included in a DCI format provided by a PDCCH that the UE receives during DRX Active Time or in RRC_CONNECTED state.

Figure 8:
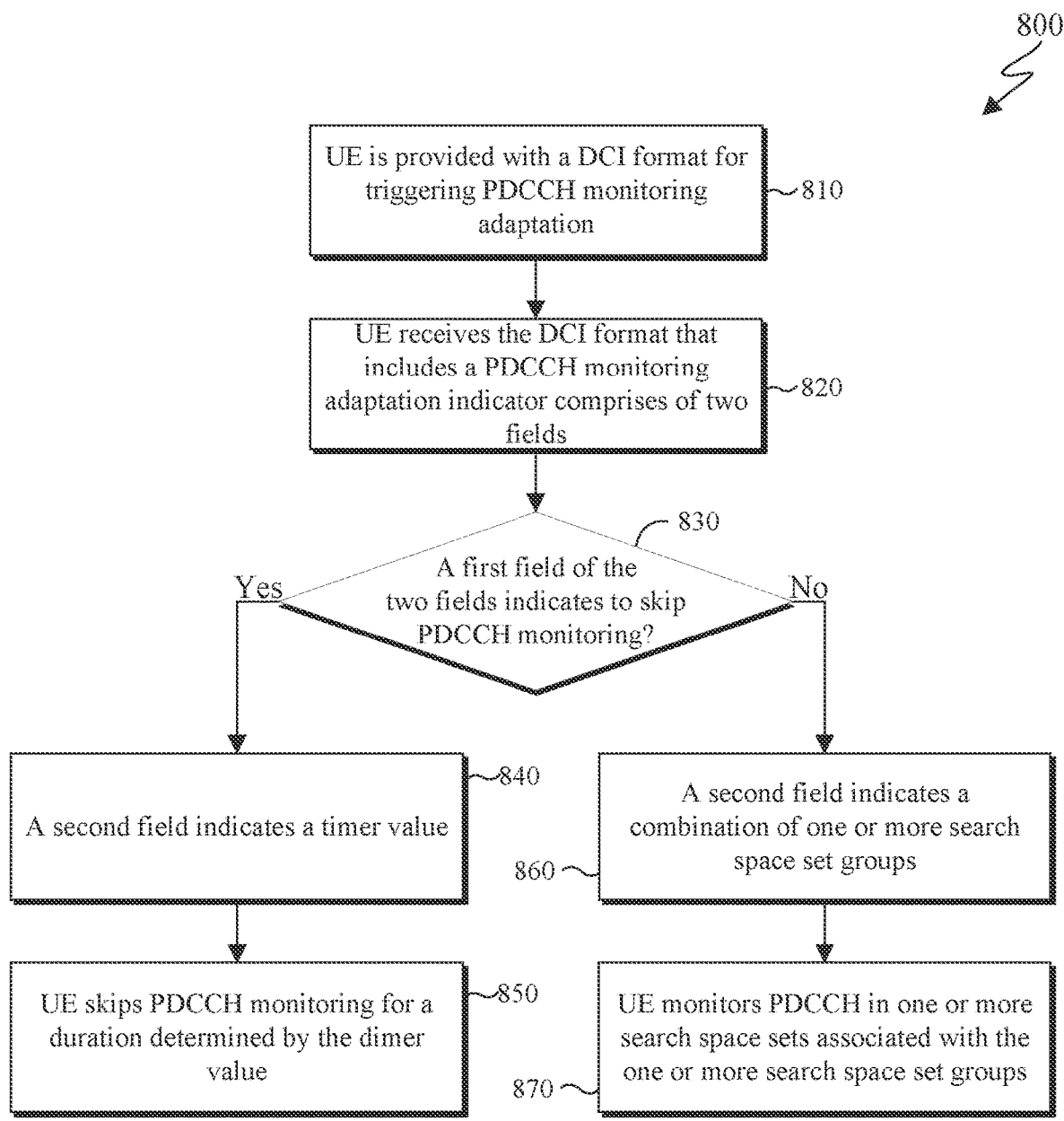
FIGS. 8 and 9 illustrate example methods of a UE procedure for PDCCH monitoring adaptation according to embodiments of the present disclosure.
Figure 9:
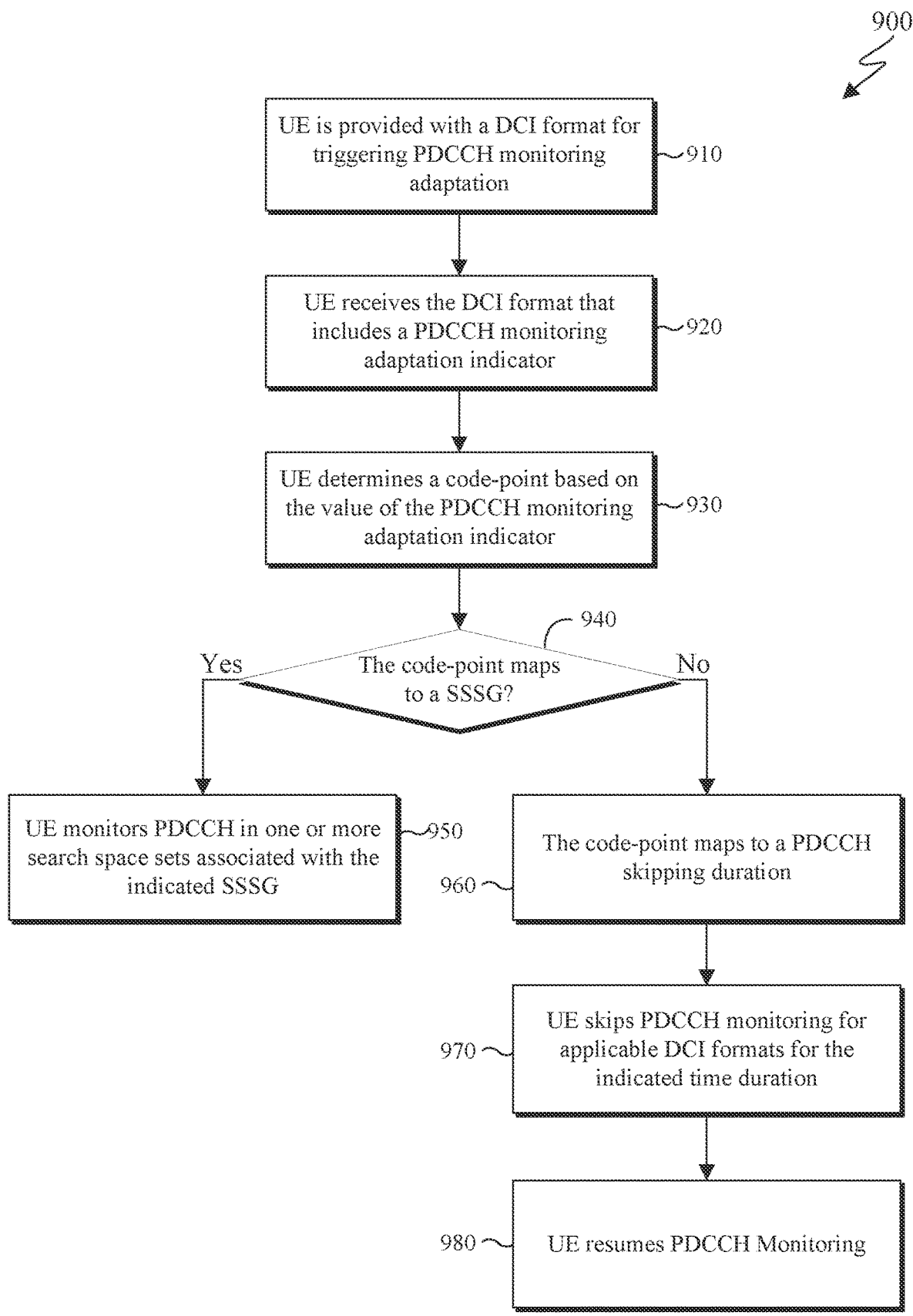

FIGS. 8 and 9 illustrate example methods 800 and 900, respectively, of a UE procedure for PDCCH monitoring adaptation according to embodiments of the present disclosure. The steps of the method 800 of FIG. 8 and the method 900 of FIG. 9 can be performed by any of the UEs 111-116 of FIG. 1, such as the UE 116 of FIG. 3. The methods 800 and 900 are for illustration only and other embodiments can be used without departing from the scope of the present disclosure.

The PDCCH monitoring adaptation indicator can be applicable to partial DCI formats. For one example, the applicable DCI formats can be DCI formats with CRC scrambled by C-RNTI, MCS-RNTI, or CS-RNTI. For another example, the applicable DCI formats are DCI formats configured to be received in UE specific search space sets or Type-3 PDCCH CSS sets.

In certain embodiments, a PDCCH monitoring adaptation indicator can apply for all applicable serving cells or can apply per cell group. For the former case, applicable serving cells can either be all configured serving cells or predetermined serving cells, for example a primary cell only or SCells only. For the latter case, a UE can be provided a number of $N_{groups} \geq 1$ cell groups. A number of $N_{groups}$ PDCCH monitoring adaptation indicators can be included in a DCI format, where each PDCCH monitoring adaptation indicator corresponds to a cell group with first to last PDCCH monitoring adaptation indicator corresponding to first to last cell group. Equivalently, a DCI format can include a single PDCCH monitoring adaptation indicator with $N_{groups}$ bits that have a one-to-one mapping with the $N_{groups}$ cell groups.

In a first approach for a joint design of SSSG switching and PDCCH skipping, a PDCCH monitoring adaptation indicator can include two fields, wherein a first field can include one bit that indicates to a UE whether to skip PDCCH monitoring, and a second field can be interpreted according to a value of the first field. When the first field indicates to the UE to skip PDCCH monitoring, for example when the first field has value "1", the second field indicates a duration for skipping PDCCH monitoring; otherwise, the second field indicates a combination of one or more SSSGs for PDCCH monitoring. For example, a combination can be all available SSSGs.

For determining a SSSG, an index of associated SSSG can be provided to UE for any configured search space set. Alternatively, UE can determine a SSSG according to RNTIs. For example, the first SSSG can be associated with DCI formats with CRC scrambled by a first set of one or more RNTIs and the second SSSG can be associated with DCI formats with CRC scrambled by a second set of one or more RNTIs.

For determining an SSSG or a PDCCH skipping duration based on the second field, a UE (such as the UE 116) can be configured a number of combinations for SSSGs. In this example, each combination includes one or more SSSGs, and a number of PDCCH skipping timers for each applicable serving cell. The size of the second field in terms of $N_{bits}^{SecondField}$ bits can be determined based on a maximum value between the number of configured combinations of SSSGs and the number of configured PDCCH skipping timers. For example, the number of PDCCH skipping timers for each applicable serving cell can be same as the number of combinations for SSSGs for the applicable serving cell. When the PDCCH monitoring adaptation indicator is for all applicable serving cells, $N_{bits}^{SecondField}$ is determined based on a maximum between the number of combinations for SSSGs and the number of PDCCH skipping timers for the applicable serving cells, such as described in Equation (3), below. In Equation (3), $N_{SSSG,i}$ and $N_{timer,i}$ are respectively a number of SSSGs and a number of PDCCH skipping timer configured for an applicable serving cell i.

$$N_{bits}^{SecondField} = \max\{\max\{N_{SSSG,i}, N_{timer,i}\}\} \quad (3)$$

When the PDCCH monitoring adaptation indicator is for a cell group j, $N_{bits}^{SecondField}$ determined based on maximum between a number of $N_{SSSG,j}$ combinations for SSSGs configured for the cell group j and a number of $N_{timer,j}$ PDCCH skipping timers configured for the cell group j, such as described in Equation (4), below.

$$N_{bits}^{SecondField} = \max\{N_{SSSG,j}, N_{timer,j}\} \quad (4)$$

When a different number of combinations for SSSGs is configured for active DL BWPs among serving cells from the cell group j, $N_{SSSG,j}$ is the maximum or minimum number of combinations for SSSGs configured for the active DL BWPs among serving cells from the cell group j.

When a different number of PDCCH skipping timers is configured for active DL BWPs among serving cells from the cell group j, $N_{timer,j}$ is the maximum or minimum number of PDCCH skipping timers configured for the active DL BWPs among serving cells from the cell group j.

The method 800 as illustrated in FIG. 8 describes an example UE procedure for PDCCH monitoring adaptation based on a joint design for SSSG switching and PDCCH skipping.

In step 810, a UE (such as the UE 116) is provided with a DCI format for triggering PDCCH monitoring adaptation. In step 820, the UE receives the DCI format in a PDCCH in an active DL BWP. It is noted that the DCI format includes a PDCCH monitoring adaptation indicator that comprises of two fields. In step 830, the UE determines whether a first field of the two fields indicates to the UE to skip PDCCH monitoring.

When the first field indicates to the UE to skip PDCCH monitoring (as determined in step 830), the UE in step 840 determines a timer value based on a second field of the two fields. In step 850, the UE skips PDCCH monitoring for a time duration determined by the timer value Alternatively, when the first field indicates to the UE to not skip PDCCH monitoring (as determined in step 830), the UE in step 860 determines a combination for one or more SSSGs based on the second field. In step 870, the UE monitors PDCCH in one or more search space sets associated with the one or more SSSGs.

In certain embodiments, a UE (such as the UE 116) determines a default SSSG for a serving cell based on one of the three example methods below. In one method, the default SSSG can be a SSSG with a smallest index for the active DL BWP of the serving cell. In a second method, the default SSSG can be the provided to the UE by a higher layer parameter. In a third method, the default SSSG can include all configured search space sets for the active DL BWP of the serving cell.

In certain embodiments, a UE (such as the UE 116) can apply the default SSSG for PDCCH monitoring in a serving cell for any of the following two example. In a first example, a second field of an PDCCH monitoring adaptation indicator may indicate a SSSG index that is not configured for the serving cell, such as when the serving cell has a smaller number of configured SSSGs than other serving cells associated with a same PDCCH monitoring adaptation indicator. For another example, a PDCCH monitoring adaptation indicator may expire after an expiration of a timer. The default search space set can apply when the PDCCH monitoring adaptation indicator expires. The timer can be provided to UE by a higher layer parameter per serving cell or per cell group. The UE decrements the timer value by one after each slot, or after each span of Y symbols when the UE is configured for span-based PDCCH monitoring based on a combination (X, Y), when the UE applies a PDCCH monitoring adaptation indicator.

In certain embodiments, a UE (such as the UE 116) can determine a default PDCCH skipping timer for a serving cell based on one of following three example methods. In a one example method, the default PDCCH skipping timer can be a PDCCH skipping timer with a smallest index for the active DL BWP of the serving cell. For another example method, the default PDCCH skipping timer can be the provided to the UE by a higher layer parameter. For yet another example, method, the default PDCCH skipping timer can be a configured PDCCH skipping timer for the active DL BWP of the serving cell with a maximum or minimum timer value.

In certain embodiments, a UE (such as the UE 116) can apply the default PDCCH skipping timer in a serving cell. This can be performed in one of the following three examples. For example, the UE can be configured only with a number of combinations for SSSGs for the serving cell. The UE can then skip the second field of an PDCCH monitoring adaptation indicator and apply the default PDCCH skipping timer for the serving cell when the UE is triggered to skip PDCCH monitoring based on the first field of the PDCCH monitoring adaptation indicator.

For another example, a second field of an PDCCH monitoring adaptation indicator may indicate a PDCCH skipping timer that is not configured for the serving cell, such as when the serving cell has a smaller number of configured PDCCH skipping timers than other serving cells having a same PDCCH monitoring adaptation indicator.

For yet another example, a PDCCH monitoring adaptation indicator may expire after an expiration of a timer. In this example, the UE can apply the default PDCCH skipping timer when the PDCCH monitoring adaptation indicator expires. The timer can be provided to UE by a higher layer parameter per serving cell or per cell group. The UE decrements the timer value by one after each slot, or after each span of Y symbols when the UE is configured for span-based PDCCH monitoring based on a combination (X, Y), when the UE applies a PDCCH monitoring adaptation indicator.

The DCI format can be a DCI format that schedules a PDSCH reception or a physical uplink shared channel (PUSCH) transmission that a UE receives in a PDCCH according to UE-specific search space, such as a DCI format 1_0 or 1_1 or 1_2 as described in REF2. Alternatively, the DCI format can be provided by a PDCCH that is received according to a common search space. A starting location of a first PDCCH monitoring adaptation indicator can be provided to UE in the configuration of the DCI format or can be defined in the specification of the system operation, for example, as the first bit after all configured fields for the DCI format.

When a UE (such as the UE 116) receives a PDCCH monitoring adaptation indicator in a DCI format in a PDCCH reception, the UE can apply a corresponding PDCCH monitoring adaptation with an application delay relative to a last symbol of the PDCCH reception or of the slot of the PDCCH reception. The application delay can be in a unit of one symbol or of one slot and can be provided to the UE by higher layer signaling or defined in the specification of the system operation. Table (1), below, is an example of an application delay for a PDCCH monitoring adaptation indicator. In particular, Table (1) is an example of the application delay according to a subcarrier spacing (SCS) configuration μ of the PDCCH that provides the DCI format with the PDCCH monitoring adaptation indicator. More than one application delay can be defined according to corresponding UE capabilities.

TABLE (1)

| μ | Application delay/symbols |
|---|---|
| 0 | 10 |
| 1 | 12 |
| 2 | 22 |

When a UE (such as the UE 116) receives a PDCCH monitoring adaptation indicator based on a DCI format in a PDCCH, to avoid a delay for a retransmission of a PDSCH that the UE received before the PDCCH and did not provide a corresponding hybrid automatic repeat request acknowledgement (HARQ-ACK) information prior to the PDCCH reception, the UE can continue to monitor a DCI format for scheduling a retransmission for the PDSCH in a configured search space set regardless of whether the PDCCH monitoring adaptation indicator indicates a PDCCH monitoring adaptation for the configured search space set. The UE can apply the PDCCH monitoring adaptation indicator for the configured search space set after providing HARQ-ACK information associated with the PDSCH reception.

In the second approach for a joint design of SSSG switching and PDCCH skipping, a PDCCH monitoring adaptation indicator can be N bits, and map to 2^N code-points. Each code-point indicates one of configured PDCCH monitoring states. The PDCCH monitoring adaptation can be triggered per serving cell or per group of serving cells. For the former case, applicable serving cells can either be all configured serving cells or predetermined serving cells, for example a primary cell only or SCells only. For the latter case, a UE can be provided a number of $N_{groups} \geq 1$ cell groups. A number of $N_{groups}$ PDCCH monitoring adaptation indicators can be included in a DCI format, where each PDCCH monitoring adaptation indicator corresponds to a cell group with first to last PDCCH monitoring adaptation indicator corresponding to first to last cell group. Equivalently, a DCI format can include a single PDCCH monitoring adaptation indicator with $N_{groups}$ bits that have a one-to-one mapping with the $N_{groups}$ cell groups.

In certain embodiments, a UE (such as the UE 116) can be configured with a number of PDCCH monitoring states per DL BWP or per serving cell common to all DL BWPs in a serving cell.

For example, regarding the configuration of a PDCCH monitoring state, a PDCCH monitoring state can be configured as a SSSG associated with one or more search space sets. When the UE receives a PDCCH monitoring adaptation indicator with code-point indicating a SSSG, the UE switches to search space sets from the indicated SSSG for PDCCH monitoring of applicable DCI formats.

For another example, regarding the configuration of a PDCCH monitoring state, a PDCCH monitoring state can be configured as a time duration for PDCCH skipping. When the UE receives a PDCCH monitoring adaptation indicator with code-point indicating a time duration for PDCCH skipping, the skips PDCCH monitoring for the indicated time duration. In one method of PDCCH skipping, the UE skips PDCCH monitoring for applicable DCI formats in search space sets based on current PDCCH monitoring state, the UE resumes or continues the PDCCH monitoring in search space sets same as those monitored before PDCCH skipping after the expiration of the skipping duration. In another method of PDCCH skipping, the UE skips PDCCH monitoring for applicable DCI formats in all configured search space sets, and resumes PDCCH monitoring for applicable DCI formats in all configured search space sets regardless of the PDCCH monitoring state before PDCCH skipping.

For example, when a PDCCH monitoring adaptation indicator has 2 bits, 4 code-points can be mapped to SSSG switching and PDCCH skipping. For instance, "00" can map to SSSG #0. For another instance, "01" can map to SSSG #1. For another instance, "10" can map to PDCCH skipping with a first configured time duration. For yet another instance, "11" can map to PDCCH skipping with a second configured time duration.

The method 900 as illustrated in FIG. 9 describes an example UE procedure for PDCCH monitoring adaptation based on the second approach.

In step 910, a UE (such as the UE 116) is provided with a DCI format for triggering PDCCH monitoring adaptation. In step 920, the UE receives the DCI format in a PDCCH in an active DL BWP. The DCI format includes a PDCCH monitoring adaptation indicator. In step 930, the UE determines a code-point based on the value of the PDCCH monitoring adaptation indicator. In step 940, the UE determines whether the code-point maps to a SSSG.

When the code-point maps to a SSSG (as determined in step 940), the UE in step 950 monitors PDCCH in one or more search space sets associated with the indicated SSSG. Alternatively, when the code-point doesn't map to a SSSG (as determined in step 940), the UE in step 960 determines the code-point maps to a PDCCH skipping duration. In step 970, the UE skips PDCCH monitoring for applicable DCI formats for the indicated time duration. In step 980, the UE resumes PDCCH monitoring after the expiration of the skipping duration.

In certain embodiments, to avoid long latency for retransmission, a retransmission timer can be considered for transition between some PDCCH monitoring states. The transition can be triggered based on any of the approaches specified in this disclosure. The value of the retransmission timer can be either configured by higher layers or be defined in the specification of the system operation. When a UE receives a PDCCH monitoring adaptation indicator in a DCI format to indicate a new PDCCH monitoring state that is different from current PDCCH monitoring state, the UE restarts or reset the retransmission timer if the DCI format schedules a PDSCH reception or a PUSCH transmission. The UE keeps the current PDCCH monitoring state before the retransmission timer expires. Once the retransmission timer expires the UE switches to the new PDCCH monitoring state. In one example, the new PDCCH monitoring state can be PDCCH skipping for a time duration, while UE monitors PDCCH according to a SSSG in current PDCCH monitoring state. In another example, the new PDCCH monitoring state can be PDCCH monitoring in a new SSSG associated with relaxed PDCCH monitoring, while current PDCCH monitoring state is PDCCH monitoring in another SSSG configured for dense PDCCH monitoring.

In certain embodiments, to avoid long latency for PDCCH monitoring adaptation, a short application delay of $N>=0$ slots can be considered for transition between some PDCCH monitoring states. The transition can be triggered based on any of the approaches specified in this disclosure. The value of the application delay can be either configured by higher layers or be defined in the specification of the system operation, for example 0 slot. For another example, the application delay can be same as the application delay for indicating minimum scheduling offset. When a UE is triggered to switch from current PDCCH monitoring state to a new PDCCH monitoring state based on a DCI format or a timer, the UE switches to the new PDCCH monitoring state after the application delay of N slots. For example, the current PDCCH monitoring state can be PDCCH skipping for a time duration, and the new PDCCH monitoring state can be PDCCH monitoring according to a SSSG. For another example, the current PDCCH monitoring state can be PDCCH monitoring in a SSSG associated with relaxed PDCCH monitoring, while the new PDCCH monitoring state can be PDCCH monitoring in another SSSG configured for dense PDCCH monitoring.

In one method of configuration of SSSG, a UE (such as the UE 116) can be configured with a SSSG for relaxed PDCCH monitoring. For example, the SSSG includes search space sets configured with PDCCH monitoring periodicity that is larger than a threshold, for example 1 slot. For another example, a SSSG index can be predefined for relaxed PDCCH monitoring, such as SSSG #0 or SSSG #1.

In another method of configuration of SSSG, a UE (such as the UE 116) can be configured with a SSSG for dense PDCCH monitoring. For example, the SSSG includes search space sets configured with PDCCH monitoring periodicity that is no larger than a threshold, for example 1 slot. For another example, a SSSG index can be predefined for dense PDCCH monitoring, such as SSSG #0 or SSSG #1.

When a UE receives a DCI format in a PDCCH that includes a PDCCH monitoring adaptation indicator and the UE will apply the PDCCH monitoring adaptation indicator with a time delay, the UE can still receive another PDCCH carrying the same DCI format during the time delay. It is noted that the UE does not expect to receive another PDCCH with DCI format that includes a different PDCCH monitoring adaptation indicator during the time delay.

In certain embodiments, a fall-back timer can be associated with SSSG switching in order to avoid negative impact due to miss-detection of PDCCH. When a UE (such as the UE 116) receives a PDCCH monitoring adaptation indicator in a DCI format to indicate a SSSG, the UE expects to stay in the SSSG for PDCCH monitoring for a time duration no larger than the fall-back timer. The UE switches back to a default PDCCH monitoring state once the fall-back timer expires. The UE restarts or resets the fall-back timer when a UE receive any new DCI format with a PDCCH monitoring adaptation indicator to indicate a SSSG switching. The value of the fall-back timer can be configured by higher layer. The default PDCCH monitoring state can be all configured search space sets.

Although FIG. 8 illustrates the method 800 and FIG. 9 illustrates the method 900 various changes may be made to FIGS. 8 and 9. For example, while the methods 800 and 900 are shown as a series of steps, various steps could overlap, occur in parallel, occur in a different order, or occur multiple times. In another example, steps may be omitted or replaced by other steps. For example, steps of the methods 800 and 900 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a communication system, the UE comprising:
   a processor; and
   a transceiver operably coupled to the processor, the transceiver configured to
      receive group indexes for search space set groups including a first search space set group and a second search space set group, and
      receive downlink control information (DCI) including a field of 2 bits,
   wherein in case that the field is a first value or a second value, the field indicates a search space set group among the search space set groups for physical downlink control channel (PDCCH) monitoring,
   wherein in case that the field is a third value, the field indicates skipping the PDCCH monitoring for a first configured time duration,
   wherein in case that the field is a fourth value, the field indicates skipping the PDCCH monitoring for a second configured time duration,
   wherein in case that the field is the first value, the field indicates performing the PDCCH monitoring according to the first search space set group,
   wherein in case that the field is the second value, the field indicates performing the PDCCH monitoring according to the second search space set group,
   wherein the transceiver is further configured to receive a third configuration of a timer associated with the search space set groups, and
   wherein the processor is further configured to:
      decrement the timer by one after each slot, and
      perform the PDCCH monitoring according to the first search space set group after the timer is expired.

2. The UE of claim 1,
   wherein in case that the field is the first value, the field indicates search space set group switching to the first search space set group, and
   wherein in case that the field is the second value, the field indicates search space set group switching to the second search space set group.

3. The UE of claim 1, wherein the first value is "00", the second value is "01", the third value is "10" and the fourth value is "11".

4. A base station (BS) in a communication system, the base station comprising:
   a processor; and
   a transceiver operably coupled to the processor, the transceiver configured to
      transmit group indexes for search space set groups including a first search space set group and a second search space set group, and
      transmit downlink control information (DCI) including a field of 2 bits,
   wherein in case that the field is a first value or a second value, the field indicates a search space set group among the search space set groups for physical downlink control channel (PDCCH) monitoring,
   wherein in case that the field is a third value, the field indicates skipping the PDCCH monitoring for a first configured time duration,
   wherein in case that the field is a fourth value, the field indicates skipping PDCCH monitoring for a second configured time duration,
   wherein in case that the field is the first value, the field indicates performing the PDCCH monitoring according to the first search space set group,
   wherein in case that the field is the second value, the field indicates performing the PDCCH monitoring according to the second search space set group,
   wherein the transceiver is further configured to receive a third configuration of a timer associated with the search space set groups,
   wherein the timer is to be decremented by one after each slot, and
   wherein the PDCCH monitoring is to be performed according to the first search space set group after the timer is expired.

5. The BS of claim 4,
   wherein in case that the field is the first value, the field indicates search space set group switching to the first search space set group, and
   wherein in case that the field is the second value, the field indicates search space set group switching to the second search space set group.

6. The BS of claim 4, wherein the first value is "00", the second value is "01", the third value is "10" and the fourth value is "11".

7. A method performed by a user equipment (UE) in a communication system, the method comprising:
   receiving group indexes for search space set groups including a first search space set group and a second search space set group; and
   receiving downlink control information (DCI) including a field of 2 bits,
   wherein in case that the field is a first value or a second value, the field indicates a search space set group among the search space set groups for physical downlink control channel (PDCCH) monitoring, wherein in case that the field is a third value, the field indicates skipping the PDCCH monitoring for a first configured time duration, wherein in case that the field is a fourth value, the field indicates skipping the PDCCH monitoring for a second configured time duration, wherein in case that the field is the first value, the field indicates performing the PDCCH monitoring according to the first search space set group, wherein in case that the field is the second value, the field indicates performing the PDCCH monitoring according to the second search space set group, and wherein the method further comprises:

receiving a third configuration of a timer associated with the search space set groups;

decrementing the timer by one after each slot; and performing the PDCCH monitoring according to the first search space set group after the timer is expired.

8. The method of claim 7, wherein in case that the field is the first value, the field indicates search space set group switching to the first search space set group, and wherein in case that the field is the second value, the field indicates search space set group switching to the second search space set group.

9. The method of claim 7, wherein the first value is "00", the second value is "01", the third value is "10" and the fourth value is "11".

* * * * *